United States Patent
Duarte Pereira et al.

(10) Patent No.: US 12,247,547 B2
(45) Date of Patent: Mar. 11, 2025

(54) IDENTIFYING RECURRENT FREE-FLOW WIND DISTURBANCES ASSOCIATED WITH A WIND TURBINE

(71) Applicant: VESTAS WIND SYSTEMS A/S, Aarhus N (DK)

(72) Inventors: Goncalo Artur Duarte Pereira, Leça do Balio (PT); Jens Van Schelve, Oporto (PT); Johnny Nielsen, Svenstrup J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/686,367

(22) PCT Filed: Aug. 25, 2022

(86) PCT No.: PCT/DK2022/050173
§ 371 (c)(1),
(2) Date: Feb. 23, 2024

(87) PCT Pub. No.: WO2023/025365
PCT Pub. Date: Mar. 2, 2023

(65) Prior Publication Data
US 2024/0401571 A1 Dec. 5, 2024

(30) Foreign Application Priority Data

Aug. 25, 2021 (DK) .............................. PA202170423

(51) Int. Cl.
*F03D 17/00* (2016.01)

(52) U.S. Cl.
CPC ....... *F03D 17/013* (2023.08); *F03D 17/0065* (2023.08); *F05B 2270/204* (2020.08); *F05B 2270/329* (2013.01)

(58) Field of Classification Search
CPC ............... F03D 17/013; F03D 17/0065; F05B 2270/204; F05B 2270/329
See application file for complete search history.

(56) References Cited

U.S. PATENT DOCUMENTS 11,231,012 B1\* 1/2022 Shartzer ................ F03D 7/0204
2016/0146190 A1 5/2016 Ravindra et al.
(Continued)

FOREIGN PATENT DOCUMENTS

EP 3536948 A1 9/2019
EP 3859147 A1 8/2021

OTHER PUBLICATIONS

Mohd Ahmad et al: "A Model-Free Approach for Maximizing Power Production of Wind Farm Using Multi-Resolution Simultaneous Perturbation Stochastic Approximation", Energies, vol. 7, No. 9, Jan. 1, 2014 (Jan. 1, 2014), pp. 5624-5646, DOI: 10.3390/en7095624.

(Continued)

*Primary Examiner* — Sean Gugger
(74) *Attorney, Agent, or Firm* — Patterson + Sheridan, LLP; Gero G. McClellan

(57) ABSTRACT

The invention provides a method of identifying recurrent free-flow wind disturbances associated with a wind turbine. The method comprises monitoring a signal indicative of a parameter associated with operation of the wind turbine, determining an expected signal of the parameter based on the monitored signal, determining a difference between values of the monitored signal and the determined expected signal, and correlating the determined differences with yaw position of a nacelle of the wind turbine. The method includes determining, based on the correlated differences, unexpected values of the parameter for different yaw positions, and identifying, based on a frequency of occurrence of (Continued)

the determined unexpected values, a recurrent free-flow wind disturbance associated with a yaw position of the nacelle.

20 Claims, 20 Drawing Sheets

(56) References Cited

U.S. PATENT DOCUMENTS

| | | |
|---|---|---|
| 2017/0284375 A1 | 10/2017 | Nielsen |
| 2019/0107100 A1 | 4/2019 | Brorsen et al. |
| 2020/0032770 A1 | 1/2020 | Nielsen |
| 2021/0207580 A1 | 7/2021 | Egedal et al. |

OTHER PUBLICATIONS

PCT International Search Report and Written Opinion of The International Searching Authority for Application PCT/DK2022/050173 dated Oct. 31, 2022 (Oct. 31, 2022).

Danish Patent and Trademark Office, 1st Technical Examination including The Search Report and Evaluation for Application PA 2021 70423 dated Feb. 10, 2022.

\* cited by examiner

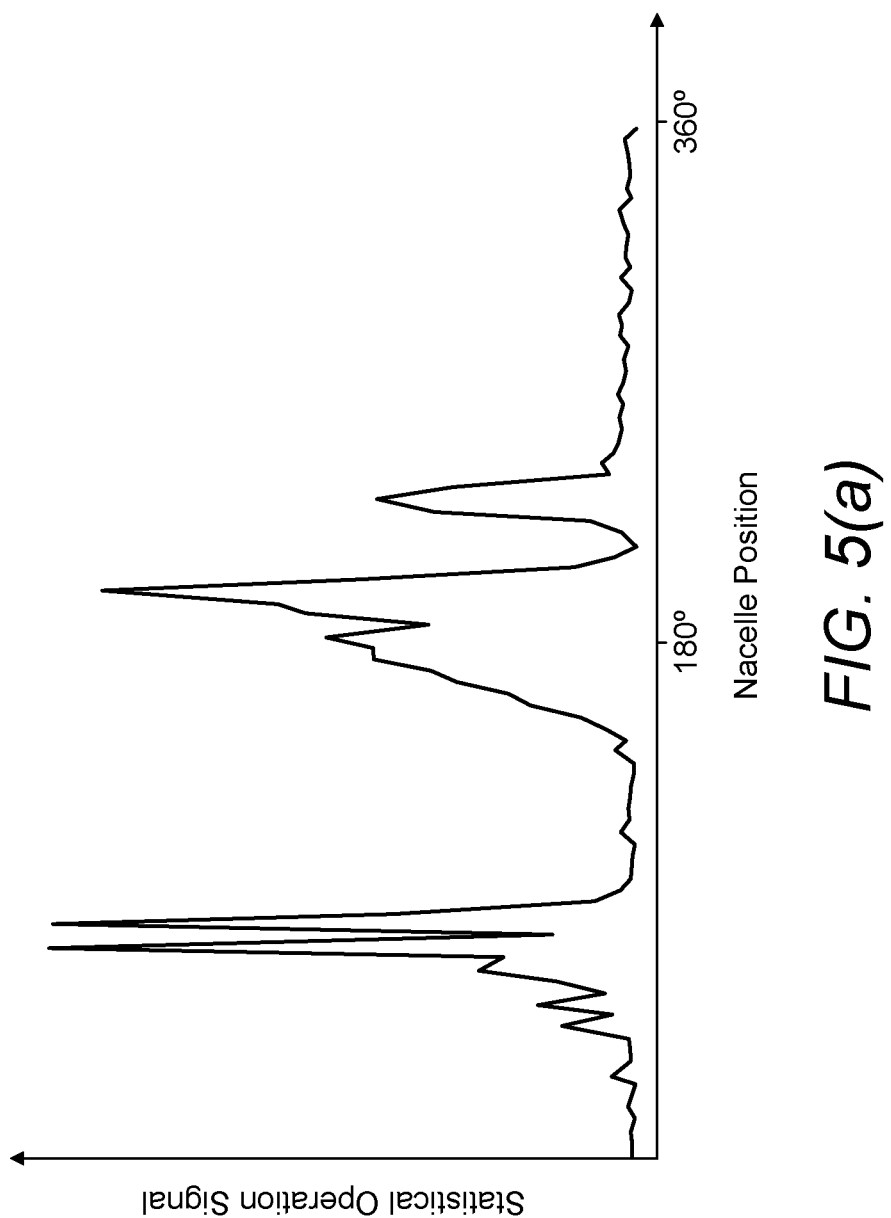

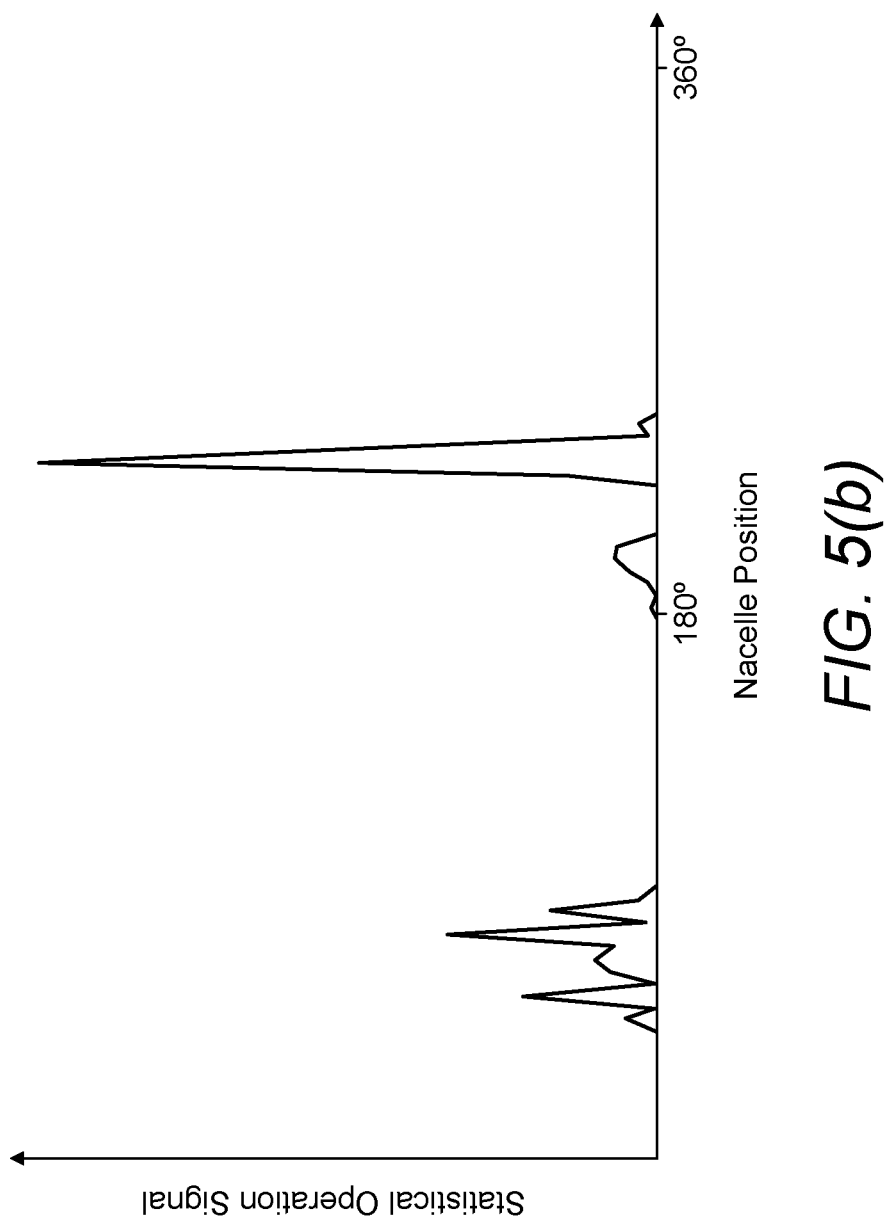

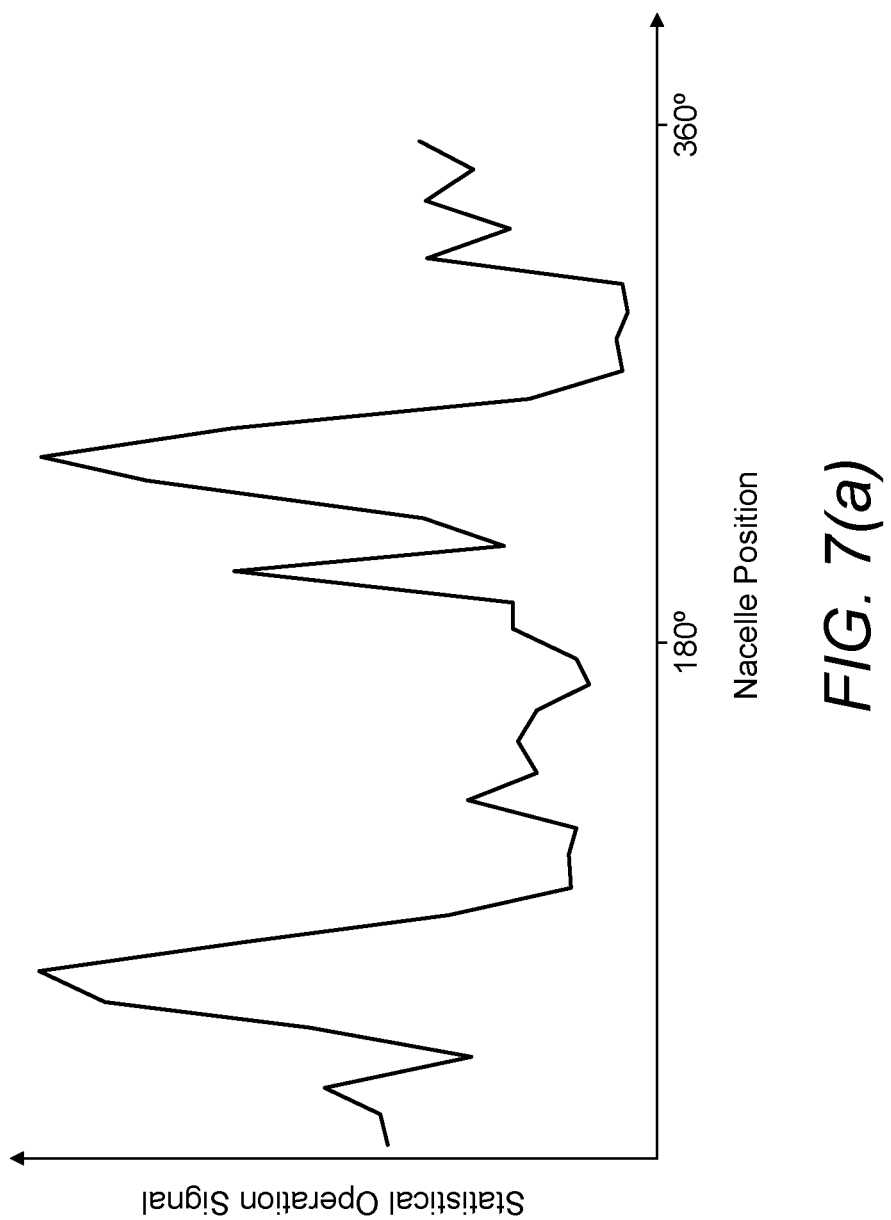

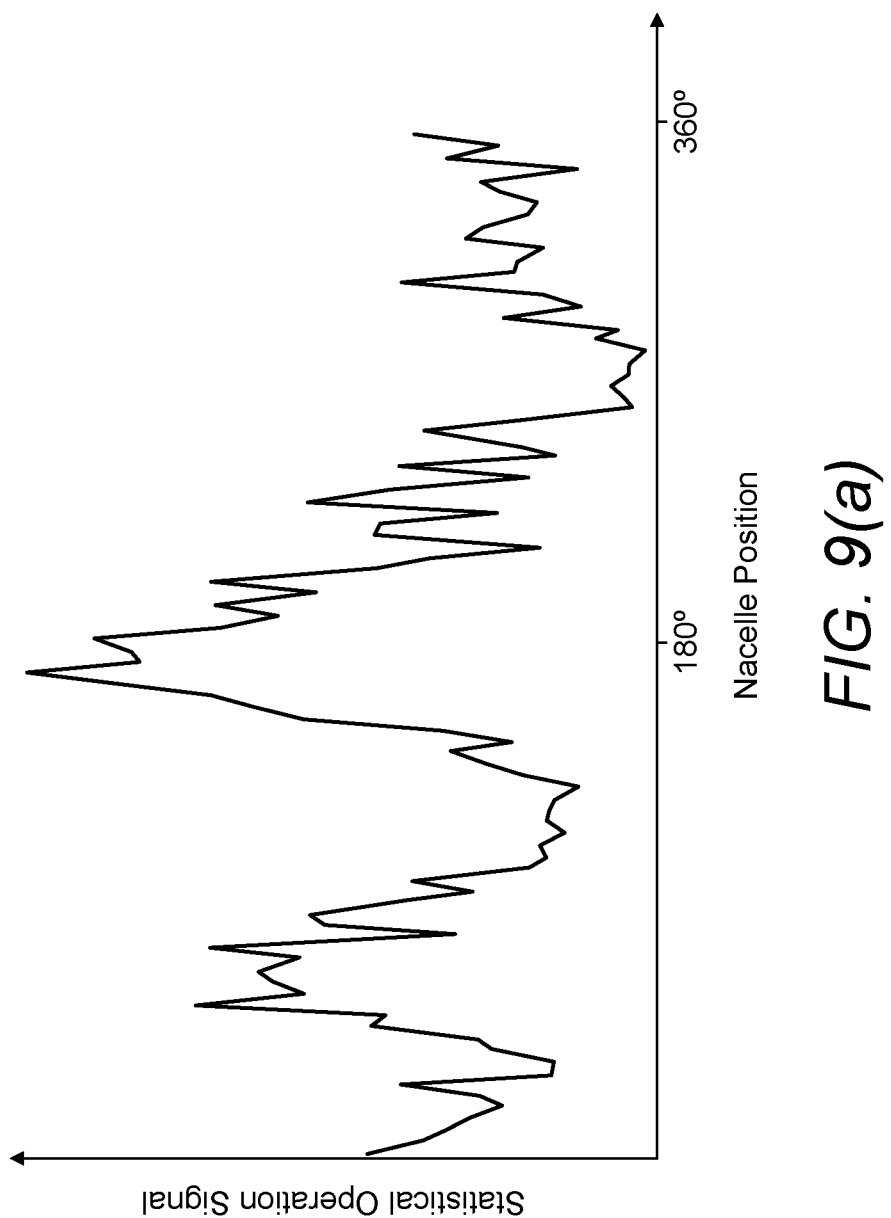

IDENTIFYING RECURRENT FREE-FLOW WIND DISTURBANCES ASSOCIATED WITH A WIND TURBINE

FIELD OF THE INVENTION

The invention relates to identifying recurrent free-flow wind disturbances associated with a wind turbine, such as wake flow in the vicinity of the wind turbine. Aspects of the invention relate to a method, to a controller, to a wind turbine, and to a non-transitory, computer-readable storage medium.

BACKGROUND

Wind turbines are used to harness wind energy to produce electrical energy. Wind turbine control technology is used to maximise energy capture and minimise loads for a variety of different wind turbine operating conditions, e.g. different wind speeds, different wind directions, turbulence, etc.

Different wind field effects in the vicinity of a wind turbine can impact on the amount of energy that may be captured and the loading experienced by components of the wind turbine. One such effect is wake flow experienced by a wind turbine. A wake may typically refer to flow downstream of an object, where flow over/around the object has resulted in recirculating flow including, for instance, turbulence and/or flow separation.

In a wind farm, one wind turbine may experience wake flow that has been generated by wind flow past another, adjacent wind turbine in the wind farm. When controlling operation of a wind turbine, therefore, it is necessary to optimise energy production and load minimisation at the level of a wind farm rather than on an individual turbine level. This is because optimising operation of one turbine may negatively impact on operation of another wind turbine at the wind farm, e.g. because of a generated wake flow, thereby reducing overall efficiency of the wind farm.

A wind turbine may experience the effects of wake flow in certain operating conditions. The identification or prediction of wind field effects such as wake flow can therefore be used to control a wind turbine to minimise such effects on turbine efficiency. This could also be used to design wind farms to minimise the effects of generated wake flow on other wind turbines in the wind farm.

There are also many other features or factors that can cause wind field disturbances in the vicinity of a wind turbine. For instance, these can include structures, such as buildings, in the vicinity of the wind turbine or wind farm, which can generate disturbances as wind flows past them. Similarly, features of the terrain in the vicinity of, or surrounding, a wind turbine or wind farm can cause wind field disturbances. Furthermore, weather phenomena—e.g. particular to a location of a wind turbine or wind farm—is another factor that can cause wind field disturbances.

Previous approaches for identifying wake flow- or other wind field disturbances—at a wind farm may necessitate the use of additional/dedicated sensors or other monitoring devices near or on wind turbines at the wind farm. Data collected by such devices may then need to be stored at a dedicated storage repository for later processing. The additional hardware and data storage requirements can therefore increase costs. Also, the collected data-which may be so-called SCADA data—is typically only provided at prescribed intervals of time, e.g. every ten minutes, with the data being averaged out over the prescribed interval. This can lead to reduced accuracy in the identification of wake flow.

It is against this background to which the present invention is set.

SUMMARY OF THE INVENTION

According to an aspect of the invention there is provided a method of identifying recurrent free-flow wind disturbances associated with a wind turbine. The method comprises monitoring a signal indicative of a parameter associated with operation of the wind turbine, determining an expected signal of the parameter based on the monitored signal, determining a difference between values of the monitored signal and the determined expected signal, and correlating the determined differences with yaw position of a nacelle of the wind turbine. The method includes determining, based on the correlated differences, unexpected values of the parameter for different yaw positions, and identifying, based on a frequency of occurrence of the determined unexpected values, a recurrent free-flow wind disturbance associated with a yaw position of the nacelle.

The method may comprise a step of determining a normalised expected signal by normalising the expected signal based on a further signal indicative of a further parameter associated with operation of the wind turbine. In one example, this further parameter may be monitored wind speed. Determining the differences may comprise comparing values of the monitored signal, normalised based on the further monitored signal (e.g. monitored wind speed), and the determined normalised expected signal.

The step of determining the expected signal may comprise determining one or more statistical properties of the monitored signal. Optionally, the statistical properties include one or more of a statistical mean, a standard deviation, and a variance.

The expected signal may be updated over time as the monitored signal is acquired. Optionally, the expected signal is determined based on the monitored signal acquired in a prescribed time interval relative to, and prior to, a current time step.

The step of determining unexpected values of the parameter may comprise determining, based on the correlated differences, a range of differences associated with normal operation of the wind turbine, and identifying correlated differences outside of the determined range to correspond to unexpected values of the parameter.

The method may comprise a step of determining an intensity of the identified recurrent free-flow wind disturbance. The intensity may be based on a magnitude of the differences between the unexpected values and the expected signal.

The method may comprise a step of determining a direction of the identified recurrent free-flow wind disturbance relative to the wind turbine. The direction may be determined as a derivative of the differences between the unexpected values and the expected signal with respect to a current yaw position of the nacelle.

The method may comprise comparing measured wind turbine performance in the presence of the identified recurrent free-flow wind disturbance relative to an expected wind turbine performance. The method may comprise retaining the identified recurrent free-flow wind disturbance if a difference between the measured and expected wind turbine performance exceeds a prescribed performance threshold. Optionally, wind turbine performance is a measure of power generated by the wind turbine or loading on one or more components of the wind turbine.

The parameter may be one of: pitch angle of one or more rotor blades of the wind turbine; one or more loads on the rotor blades; acceleration of the top of a tower of the wind turbine; wind speed in the vicinity of the wind turbine; wind direction in the vicinity of the wind turbine; turbulence intensity in the vicinity of the wind turbine; and, grid power.

The method may comprise performing the method steps for a plurality of different parameters. The method may comprise combining the identified recurrent free-flow wind disturbances for each of the different parameters to obtain an overall identification of one or more recurrent free-flow wind disturbances.

The method may comprise determining a confidence level associated with the identified recurrent free-flow wind disturbance. The confidence level may be determined based on at least one of: a level of agreement between an output of the method steps for the plurality of different parameters; and, an amount of signal data on which the identification is based.

The recurrent free-flow wind disturbance may be wake flow in the vicinity of the wind turbine.

The method may comprise controlling operation of the wind turbine based on the identified recurrent free-flow wind disturbance. Optionally, controlling operation of the wind turbine comprises at least one of controlling yaw position of the nacelle, controlling pitch angle of one or more wind turbine rotor blades, and controlling a speed of a generator of the wind turbine.

According to another aspect of the invention there is provided a non-transitory, computer-readable storage medium storing instructions thereon that when executed by one or more processors cause the one or more processors to perform a method as described above.

According to another aspect of the invention there is provided a controller for identifying recurrent free-flow wind disturbances associated with a wind turbine. The controller is configured to monitor a signal indicative of a parameter associated with operation of the wind turbine, determine an expected signal of the parameter based on the monitored signal, determine a difference between values of the monitored signal and the determined expected signal, and correlate the determined differences with yaw position of a nacelle of the wind turbine. The controller is configured to determine, based on the correlated differences, unexpected values of the parameter for different yaw positions, and identify, based on a frequency of occurrence of the determined unexpected values, a recurrent free-flow wind disturbance associated with a yaw position of the nacelle.

According to another aspect of the invention there is provided a wind turbine comprising a controller as described above.

BRIEF DESCRIPTION OF THE DRAWINGS

Examples of the invention will now be described with reference to the accompanying drawings, in which:

FIG. 5(*a*) illustrates a moving variance of blade pitch for different yaw positions of a nacelle of the wind turbine of FIG. 1, and FIG. 5(*b*) illustrates the moving variance after one or more processing steps of the method of FIG. 3 have been applied;

DETAILED DESCRIPTION

The presence of various wind field effects—or free-flow wind disturbances—in the vicinity of/proximal to a wind turbine can influence operation of the wind turbine, i.e. can cause changes in wind turbine states. In particular, certain wind field effects can negatively impact operating efficiency of the wind turbine, for instance by reducing the amount of wind energy being harvested by the wind turbine (and therefore reducing the power production of the wind turbine), and/or by increasing the loads experienced by components of the turbine (thereby potentially reducing lifespan of the components).

Of particular interest are wind field effects that are recurring, i.e. that are repeated in a predictable manner in certain operating conditions. It may therefore be possible to mitigate against the effects of such recurring wind field effects if their existence and effects can be predicted. One such recurring wind field effect is a static wake, detected over a longer period such that its future occurrence may be predictable. This would be in contrast to a new wake that is created in front of a wind turbine, and which is detected in real-time.

The present invention provides for identifying recurrent free-flow wind disturbances (recurrent wind field effects) associated with a wind turbine. The invention is advantageous in that it provides for accurate identification of such recurrent disturbances—e.g. (static) wake flow-using the current hardware and signals of a wind turbine. That is, no external/additional hardware, such as sensors, are needed, thereby minimising costs. Also, no information external to the wind turbine is needed. The invention may therefore beneficially be retrofitted to/included in existing wind turbines. The invention is also advantageous in that it provides for real-time detection of wind field effects that may be recurring wind field effects. This is because the identification is based on measured or estimated signals from the wind turbine, e.g. signals indicative of wind turbine sensor measurements, which may be received and/or determined at each time step of the wind turbine controller (or at certain time steps thereof). The invention further advantageously identifies a recurrent wind field effect in association with at least one variable of the wind turbine operation. In one example, this variable is nacelle yaw position. This means that control of the wind turbine can be performed based on this association, for instance to avoid the wind turbine operating for extended periods at certain yaw positions of the nacelle. Examples of the invention will now be described, and further advantages and benefits of the invention are outlined, and will become apparent, throughout.

Figure 1:
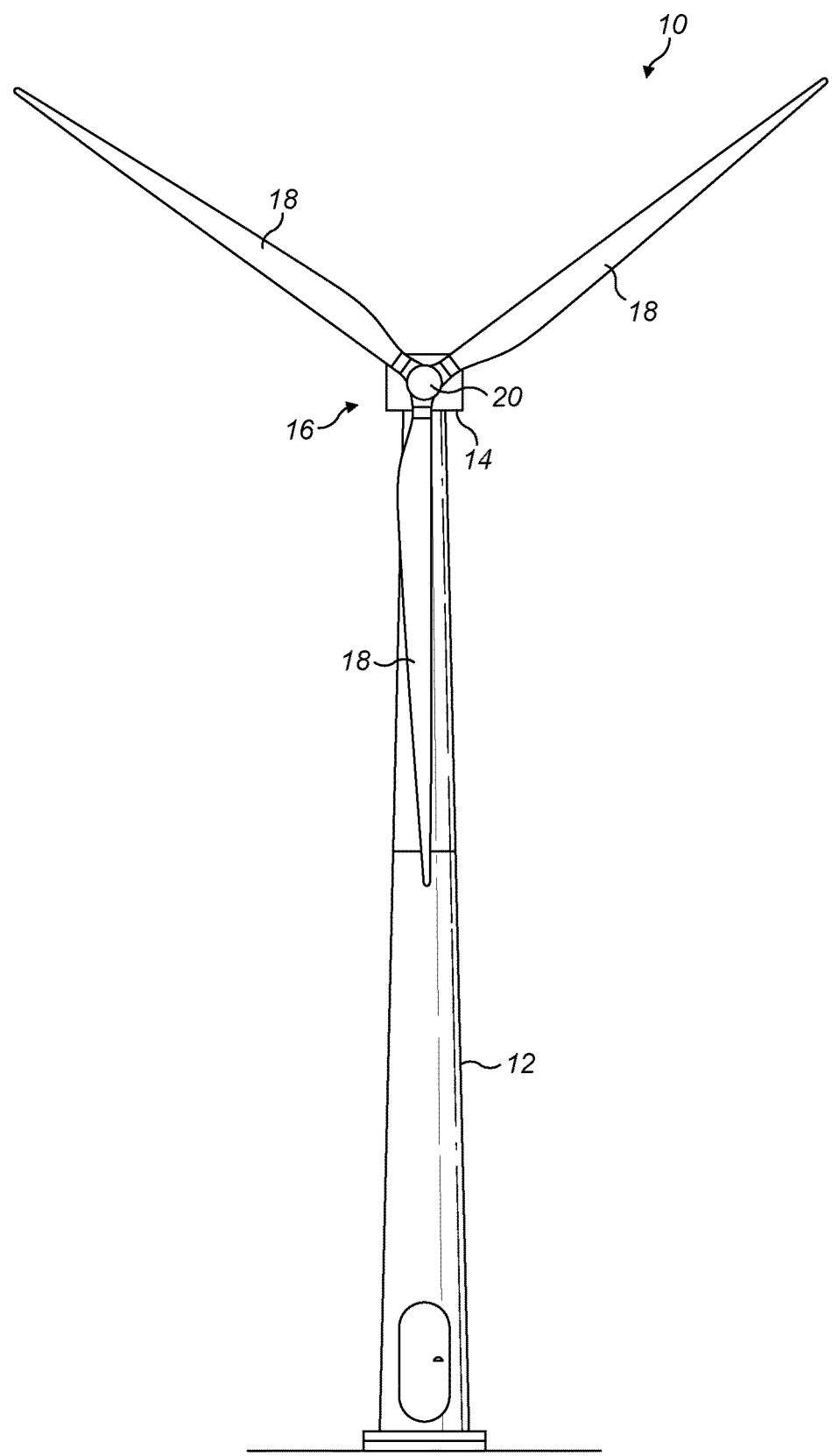
FIG. 1 schematically illustrates a wind turbine in accordance with an aspect of the invention.

FIG. 1 shows a wind turbine 10 in which an example of the disclosure may be incorporated. The wind turbine 10 comprises a tower 12 supporting a nacelle 14 to which a rotor 16 is mounted. The rotor 16 comprises a plurality of wind turbine blades 18 that extend radially from a hub 20. In this example, the rotor 16 comprises three blades 18 and a single rotor 16, although other configurations including any suitable number of blades and rotors are possible. The wind turbine 10 may be located on a wind farm (not shown) including a plurality of wind turbines. In particular, the wind turbine 10 may be located adjacent to one or more other wind turbines.

Figure 2:
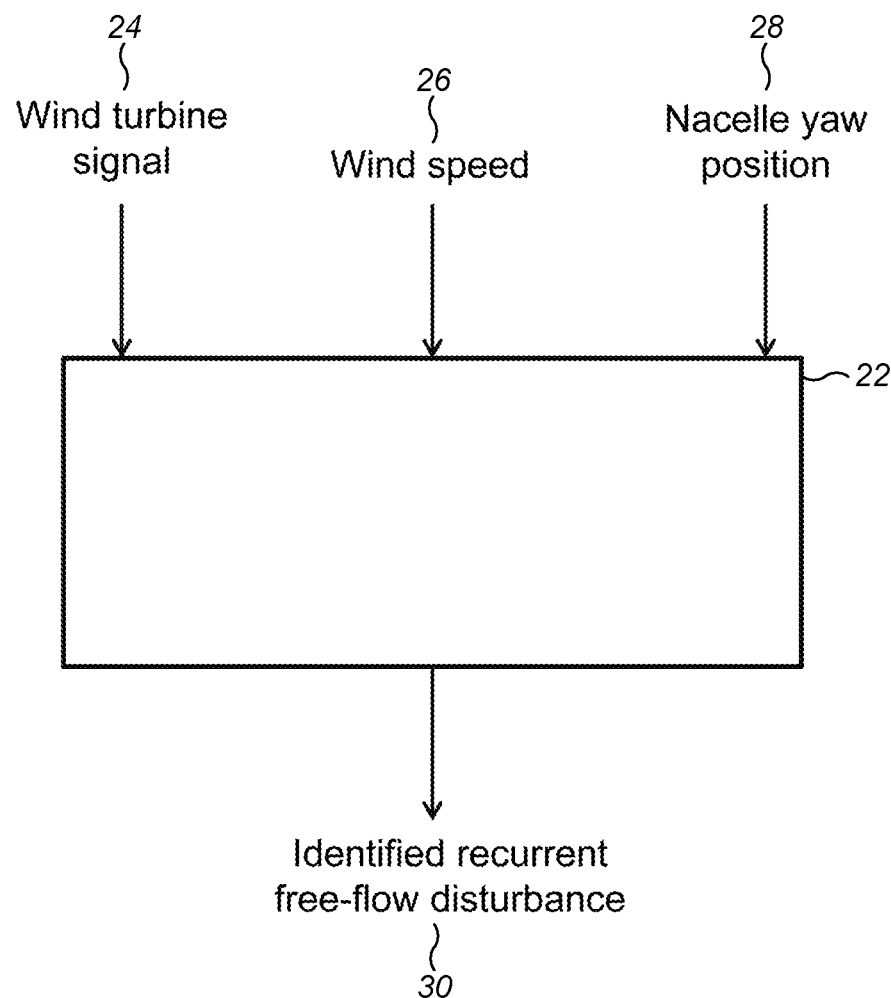
FIG. 2 schematically illustrates a controller of the wind turbine of FIG. 1, in accordance with an aspect of the invention.

FIG. 2 shows a wind turbine controller 22 in accordance with an example of the disclosure which may be implemented in the wind turbine 10 of FIG. 1. The controller 22 may be configured to output or transmit control signals for controlling operation of the wind turbine. For instance, the controller 22 may output signals to one or more actuator systems of the wind turbine 10 for adjusting a pitch angle of one or more of the rotor blades 18, and/or output signals to control a speed of a generator of the wind turbine 10. Furthermore, the controller 22 may output control signals to a yaw system of the wind turbine 10 to adjust a yaw position of the nacelle 14. The particular control signals, or other outputs, to be transmitted by the controller 22 may be determined by the controller 22 and be based on one or more inputs received by the controller 22. For instance, these inputs can include one or more measurements or signals received from sensors of the wind turbine 10, e.g. wind speed sensors, load sensors, accelerometers, etc.

The controller 22 may be in the form of any suitable computing device, for instance one or more functional units or modules implemented on one or more computer processors. Such functional units may be provided by suitable software running on any suitable computing substrate using conventional or customer processors and memory. The one or more functional units may use a common computing substrate (for example, they may run on the same server) or separate substrates, or one or both may themselves be distributed between multiple computing devices. A computer memory may store instructions for performing the methods performed by the controller, and the processor(s) may execute the stored instructions to perform the method.

The controller 22 illustrates inputs thereto, and outputs therefrom, for identifying recurrent wind field effects in accordance with an example of the invention. In particular, FIG. 2 illustrates that the controller 22 receives the wind turbine signal 24. This signal can be indicative of how certain aspects of the wind turbine 10 is operating, and can include signals from one or more sensors of the wind turbine 10, for instance. Specifically, the wind turbine signal 24 can include measured or estimated values of different parameters that are indicative of wind turbine operation, or that influence wind turbine operation. Such parameters can include one or more loads experienced by the rotor blades 18 (e.g. edgewise or flapwise loads), and a pitch angle of one or more of the rotor blades 18. The parameters can also include an acceleration of the top of the wind turbine tower 12, e.g. side-to-side, fore-aft, and/or torsional tower top accelerations. Furthermore, the parameters may include an intensity of turbulence that is present in the vicinity of the wind turbine 10, and a level of power that is being produced by the wind turbine 10 and provided to the grid. The parameters can also include environmental conditions in which the wind turbine 10 is operating, such as wind speed and/or wind direction. Some of the parameters may be directly measurable by sensors of the wind turbine (e.g. blade load sensors, accelerometers, etc), while some other parameters may be determined or estimated based on other sensor measurements and/or control signals output by the controller 22.

The controller 22 may also receive an indication of wind speed 26 in the vicinity of the wind turbine 10. This may be obtained, for instance, from a suitable sensor of the wind turbine 10. In some examples, the wind speed is received by the controller 22 as part of the wind turbine signal 24. The controller 22 also receives an indication of the (current) yaw position of the nacelle 14 of the wind turbine 10. This may be in the form of a control signal indicative of a yaw position that the yaw system of the wind turbine 10 has controlled the nacelle 14 to assume.

The controller 22 may output an indication of an identified recurrent free-flow disturbance, such as a static wake, determined based on the inputs. The indication may include determined details of the disturbance, such as one or more operating variables determined to be associated with the identified disturbance, as will be described below. The disturbance details may also include an intensity of the disturbance and/or a direction or location of the disturbance relative to the wind turbine 10, and may further include a confidence level indicative of a confidence that the identified disturbance is an accurate identification. This will be discussed further below.

Figure 3:
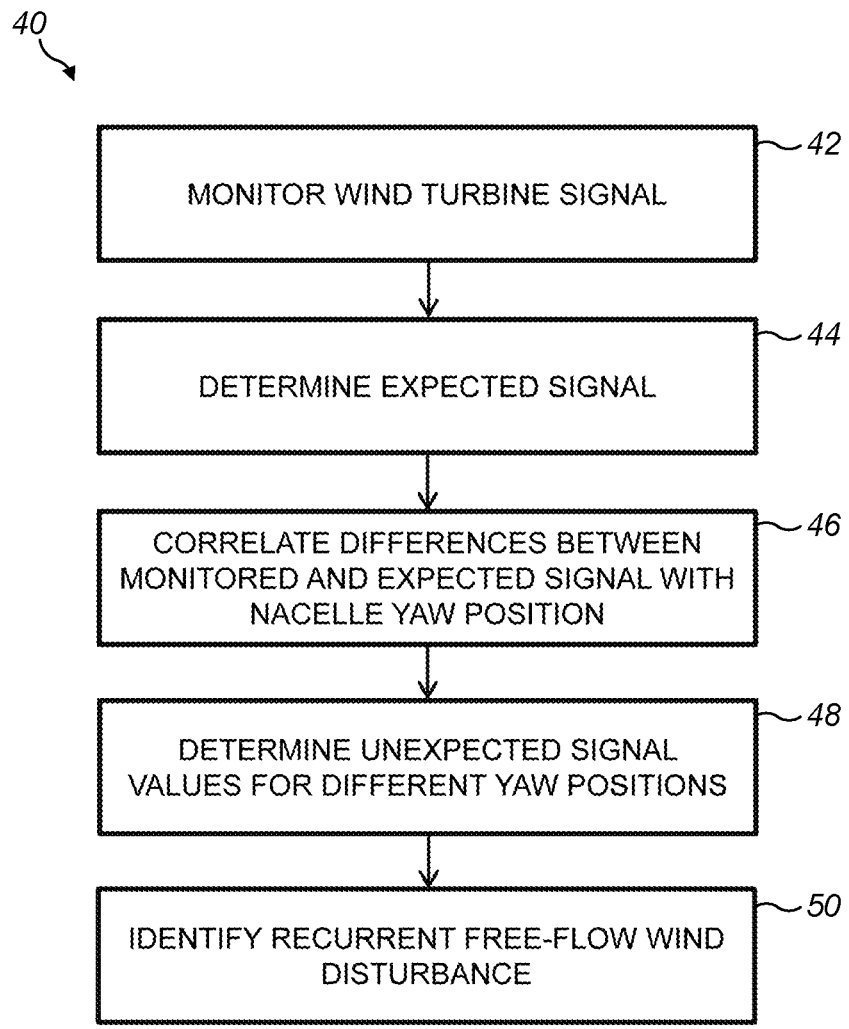
FIG. 3 illustrates steps of a method performed by the controller of FIG. 2, in accordance with an aspect of the invention.

FIG. 3 illustrates steps of a method 40, performed by the controller 22, for identifying recurrent free-flow wind disturbances in accordance with an example of the invention. At step 42, the method 40 involves monitoring the signal 24 indicative of a parameter associated with operation of the wind turbine 10. Monitoring changes in the parameter—examples of which are provided above—over time can be used to identify the presence of wind field effects in the vicinity of the wind turbine 10, such as wake flow. In particular, the signal 24 may be monitored over a sufficiently long time period that typical values of the parameter in a variety of different wind turbine and environmental operating conditions may be ascertained and analysed. For instance, the initial monitoring may be over a period of a number of hours, but may typically be over a number of days or weeks.

At step 44 of the method 40, the monitored signal 24 is used to determine a so-called expected signal (or typical signal, or reference signal) of the parameter. This may involve recording one or more statistical properties of the monitored signal as the signal data is received by the controller 22. In practice, wind turbines do not store acquired sensor signals for long periods of time, in order to reduce data storage requirements of the wind turbine 10. For instance, sensor data may be stored for a few hours—e.g. two hours-before being discarded. Therefore, it is generally not possible store all of the acquired data obtained while monitoring the wind turbine signal over an extended period and then determine the expected signal. Instead, the expected signal may be determined and updated (e.g. in real-time or at prescribed intervals) as the monitored signal data is acquired in step 32, and before it is discarded by the wind turbine 10. As mentioned above, the expected signal may be in the form of (and therefore stored as) one or more statistical properties (statistical operation signals). Such properties can include a statistical mean, a standard deviation, a variance, or any other suitable statistical property of the monitored signal. It will be appreciated that storing determined statistical properties of a monitored signal in this way requires substantially less data storage than storing the monitored signal data itself.

The expected signal may be updated to reflect all acquired data from when the wind turbine signal 24 starts being monitored. Alternatively, as the expected signal is updated to include the most recently acquired data, older data may be 'forgotten' so that it no longer contributes to the expected signal. Therefore, at any given time the expected signal may reflect monitored signal data acquired in a set period of time immediately prior to the current time.

The expected signal is to be used as a reference point to identify when the monitored signal deviates from typical values thereof. This is because such deviation can be indicative of a change in wind turbine state caused by a wind field disturbance. However, a certain degree of variation in the monitored signal is to be expected during normal operation of the wind turbine 10 across different (but normal) operating conditions. Indeed, a different amount of variation in the monitored signal may be typical for different operating conditions. One example of such an operating condition is wind speed in the vicinity of the wind turbine 10. That is, different levels of variation in the monitored signal can be expected during normal operation of the wind turbine 10 for different wind speeds.

Figure 4:
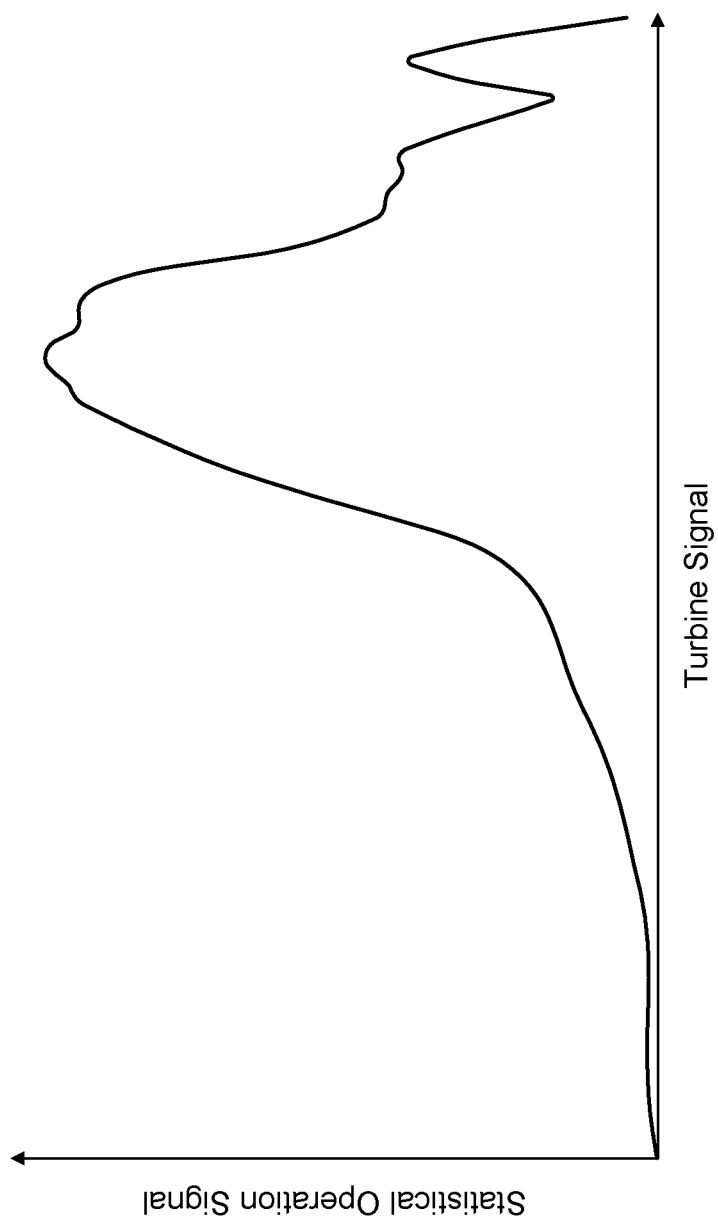
FIG. 4 illustrates an example of how expected values of a wind turbine parameter monitored by the controller of FIG. 2 varies for different wind speeds.

FIG. 4 illustrates an example of how the expected signal (statistical operation signal) may vary for different values of a particular wind turbine signal which, in this example, is different wind speeds. In this example, the parameter being monitored by the monitored signal is the pitch angle of the rotor blades 18, and the expected statistical variance of monitored values of the parameter is shown for different wind speeds. As may be seen in the example of FIG. 4, the variance in the monitored signal generally increases monotonically for increasing wind speed from 0 m/s to approximately 21 m/s. For wind speeds greater than 21 m/s, the variance generally decreases monotonically, before fluctuating between approximately 28 m/s and 30 m/s. It will be understood, therefore, that values of the monitored signal that deviate by a certain amount may be within a normal operating range for certain wind speeds, but outside of a normal operating range for other wind speeds.

In order to more readily establish when deviations in the monitored signal are indicative of a change in wind turbine state caused by a wind field disturbance rather than normal deviations for a given operating condition, the expected signal may be normalised prior to being used to identify potential wind field disturbances. In particular, the expected signal may be normalised relative to (or based on) a dominant variable of wind turbine operation that causes fluctuation or variance in the monitored signal parameter. In the described example, the expected signal is normalised based on the received or monitored wind speed 26 received by the controller 22; however, it will be appreciated that different variables or parameters may be used to normalise the expected signal. The particular parameter used for normalisation may be selected based on which variable or parameter is a dominant variable in the sense of impacting the results for the monitored variable.

Once sufficient data has been collected to determine an expected signal that accurately represents typical values of the parameter across a variety of operating conditions of the wind turbine 10, the expected signal can be used to determine whether parameter values from the monitored signal fall within an expected range for normal wind turbine operation, or whether they fall outside of the expected range, potentially indicating the presence of a wind field disturbance.

At step 46 of the method 40, the controller 22 determines a difference between values of the monitored signal and the determined expected signal. The determined differences are then correlated with yaw position 28 of the wind turbine nacelle 14, i.e. the yaw position of the nacelle 14 when the monitored signal value is acquired. In particular, the determined differences are binned against the yaw position of the nacelle 14, thereby mapping deviation from expected values for different nacelle positions. In this way, it can be ascertained whether certain yaw positions of the nacelle 14 are associated with deviations in the wind turbine signal, possibly as a result of wind field disturbances. Each bin can represent a suitable angle range of nacelle yaw position, e.g. each bin represent s a four-degree range, with bins being provided to cover the entire possible range of yaw positions of the nacelle 14.

At step 48 of the method 40, the controller 22 determines, based on the correlated differences, unexpected values of the parameter for different yaw positions. In particular, for each yaw position one or more statistical properties of the correlated differences may be determined. One or more techniques may then be applied to determine whether the correlated differences for each yaw position are larger than what would be expected during normal operation and, if so, this may be regarded as an unexpected signal.

The differences or deviations may be analysed using one or more frequency distribution techniques, for instance to determine a range of values that would be considered to represent normal or non-disturbed operation of the wind turbine 10, e.g. including medians, percentiles, etc. There may be a general assumption that a wind turbine—or a wind farm including a plurality of wind turbines—is positioned such that it operates for the majority of the time without perturbations of the free-flow wind. Values outside of the expected normal operation, i.e. outliers or unexpected values, will register higher differences to expected values.

At step 50 of the method 40, the controller 22 identifies, based on a frequency of occurrence of the determined unexpected values, a recurrent free-flow wind disturbance associated with a yaw position of the nacelle. The present disclosure is aimed at identifying wind field disturbances that occur over longer periods. For instance, the disclosure is aimed at identifying static wakes that impact on the performance of the wind turbine 10, rather than detection in real-time of a new wake created in front of the wind turbine 10.

The method therefore analyses whether unexpected values or signals associated with a particular nacelle yaw position—i.e. a signal that is sufficiently different from the expected value—recur over time. If the unexpected signal is recorded as a moving variance, for instance, then a sufficiently high variance over time from the expected signal for a particular yaw position may indicate a relatively frequent occurrence of unexpected values at said yaw position, which may indicate the presence of a recurrent free-flow wind disturbance associated with said a yaw position.

FIGS. 5(a) and 5(b) illustrate an example of the identification of wakes associated with certain nacelle yaw positions of the wind turbine 10, in accordance with the above-described method. As in the example illustrated in FIG. 4, the parameter being monitored by the monitored signal is the pitch angle of the rotor blades 18. FIG. 5(a) illustrates a statistical operation signal—in this example, a moving variance of the blade pitch—for each yaw position of the nacelle 14. It may be seen that the variance is significantly higher for some yaw positions that others. FIG. 5(a) indicates that in this example there are in fact static wakes associated with yaw positions corresponding to approximately 80 degree and approximately 230 degrees. However, the variance associated with some other yaw positions is also relatively high—e.g. a yaw position of approximately 200 degrees—and so the monitored signal is analysed in accordance with the above-described method in order to accurately identify yaw positions associated with wind field disturbances. In particular, the acquired signals are normalised based on a particular signal of the wind turbine which, in this example, is wind speed (as described above, and illustrated in FIG. 4), and then the expected pattern or signal is removed from the monitored signal to indicate differences in the monitored signal from the expected signal for different yaw positions. Specifically, the resulting signal is illustrated in FIG. 5(b). It may be seen that the higher variance values associated with yaw positions of approximately 80 and 230 degrees remain, whereas the variance associated with a yaw position of approximately 200 degrees (compared to the other peaks) is significantly lower than in FIG. 5(a). This indicates that the high variance at approximately 200 degrees in FIG. 5(a) was as a result of the influence of wind speed on the monitored signal, whereas the high variance at 80 and 230 degrees arises for a different reason, in this case the presence of static wakes associated with those yaw positions.

If a recurrent free-flow wind disturbance is identified, then the method may include a step of determining an intensity of the identified disturbance. In particular, the intensity may be based on a magnitude of the differences between the unexpected values and the expected signal, e.g. a magnitude of the moving variance of the monitored signal. Specifically, the differences may be normalised by (or relative to) the maximum absolute values, with peak intensity matching the (absolute) maximum difference to expected values. In this way, the intensity may be normalised to be between 0 and 1, for instance, with a disturbance intensity equal to 1 corresponding to the biggest spike, i.e. the biggest difference, and a disturbance intensity equal to 0 corresponding to no disturbance. This normalisation would need to be dynamic as it is unknown a priori what level of differences are to be expected.

The results will also be different dependent on the particular type of wind turbine under consideration, and the particular location.

The method may include a step of determining a direction of the identified disturbance. In particular, the direction may be determined as a derivative of the differences between the unexpected values and the expected signal with respect to a current yaw position of the nacelle. Specifically, the mapping of the deviation from expected values may be differentiated for the real-time nacelle yaw position and cross-referenced with the determined disturbance intensity. In one example, the disturbance direction may be determined to be one of left, centre or right relative to the wind turbine 10, in dependence on the determined derivative, e.g. an increasing difference with yaw position indicates 'left' and a decreasing difference with yaw position indicates 'right'. This may be represented by a range from −1 (left), through 0 (centre), to 1 (right).

In the examples illustrated in FIGS. 4 and 5, blade pitch angle is used as the parameter being monitored in the wind turbine signal in order to detect disturbances. However, as mentioned previously, many different parameters in the wind turbine signal may be used for this purpose.

Figure 6A:
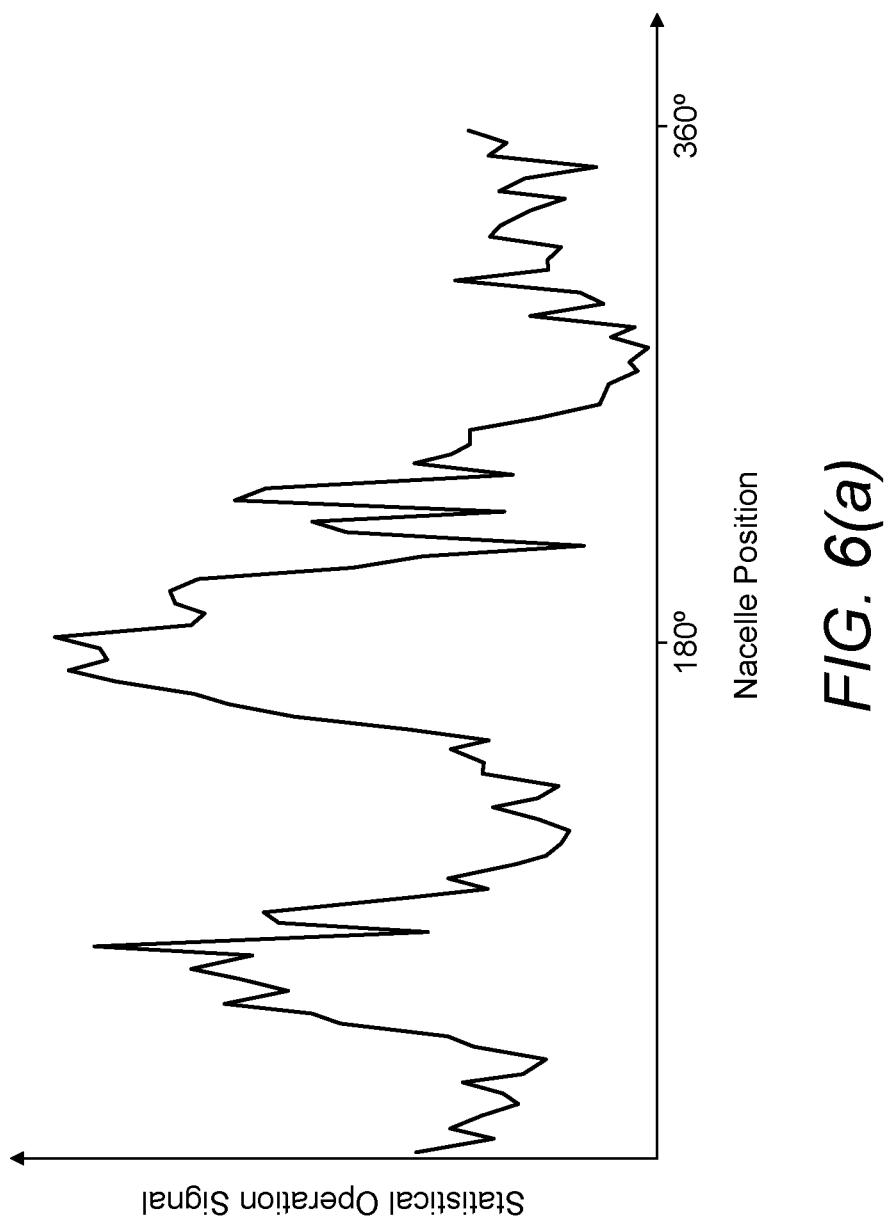
FIG. 6(*a*) illustrates a moving variance of a side-to-side acceleration of a top of a tower of the wind turbine of FIG. 1 for different yaw positions of the nacelle of the wind turbine of FIG. 1, FIG. 6(*b*) illustrates how expected values for a side-to-side tower top acceleration parameter monitored by the controller of FIG. 2 varies for different wind speeds, and FIG. 6(*c*) illustrates the moving variance for different wind speeds after one or more processing steps of the method of FIG. 3 have been applied.
Figure 6B:
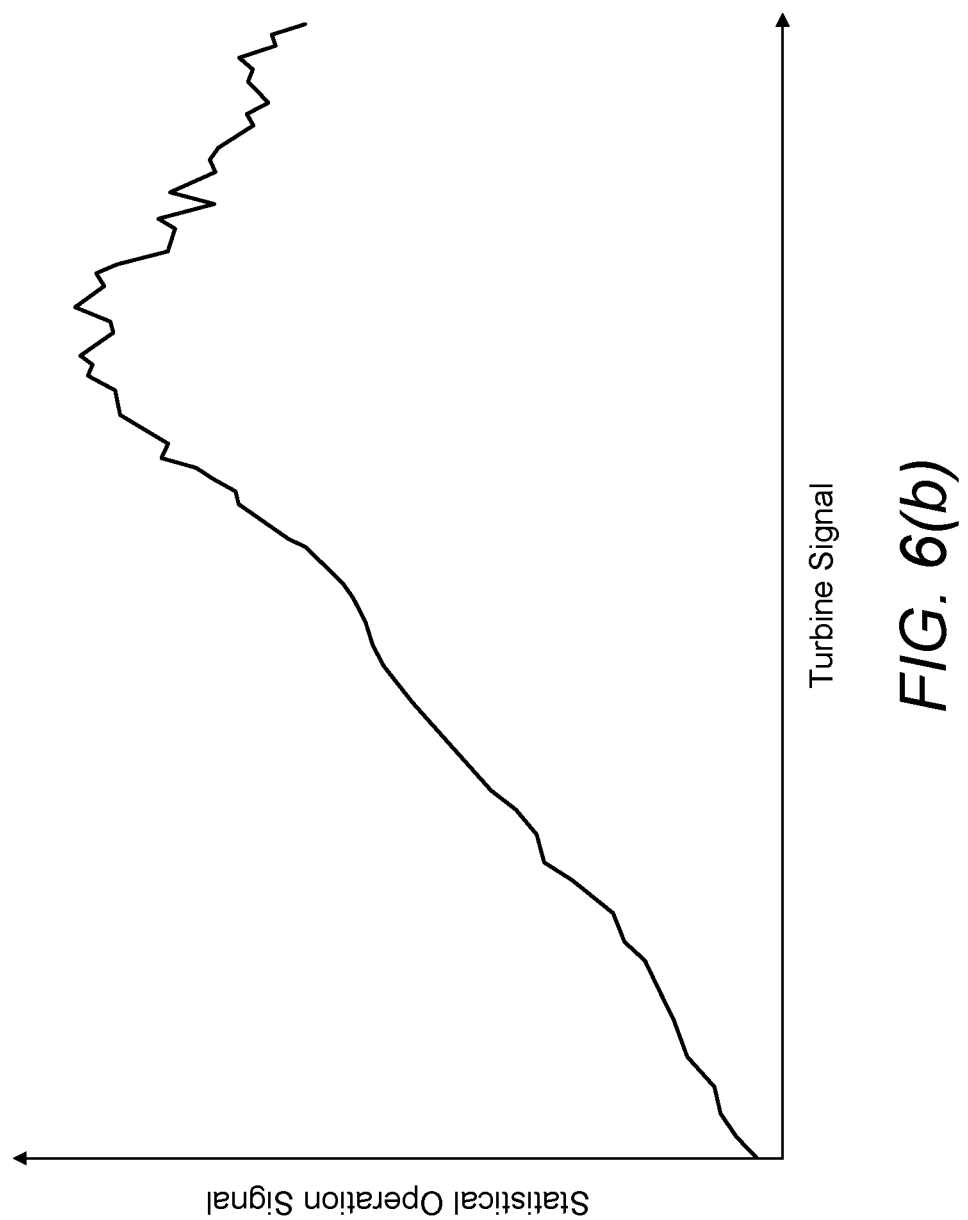
Figure 6C:
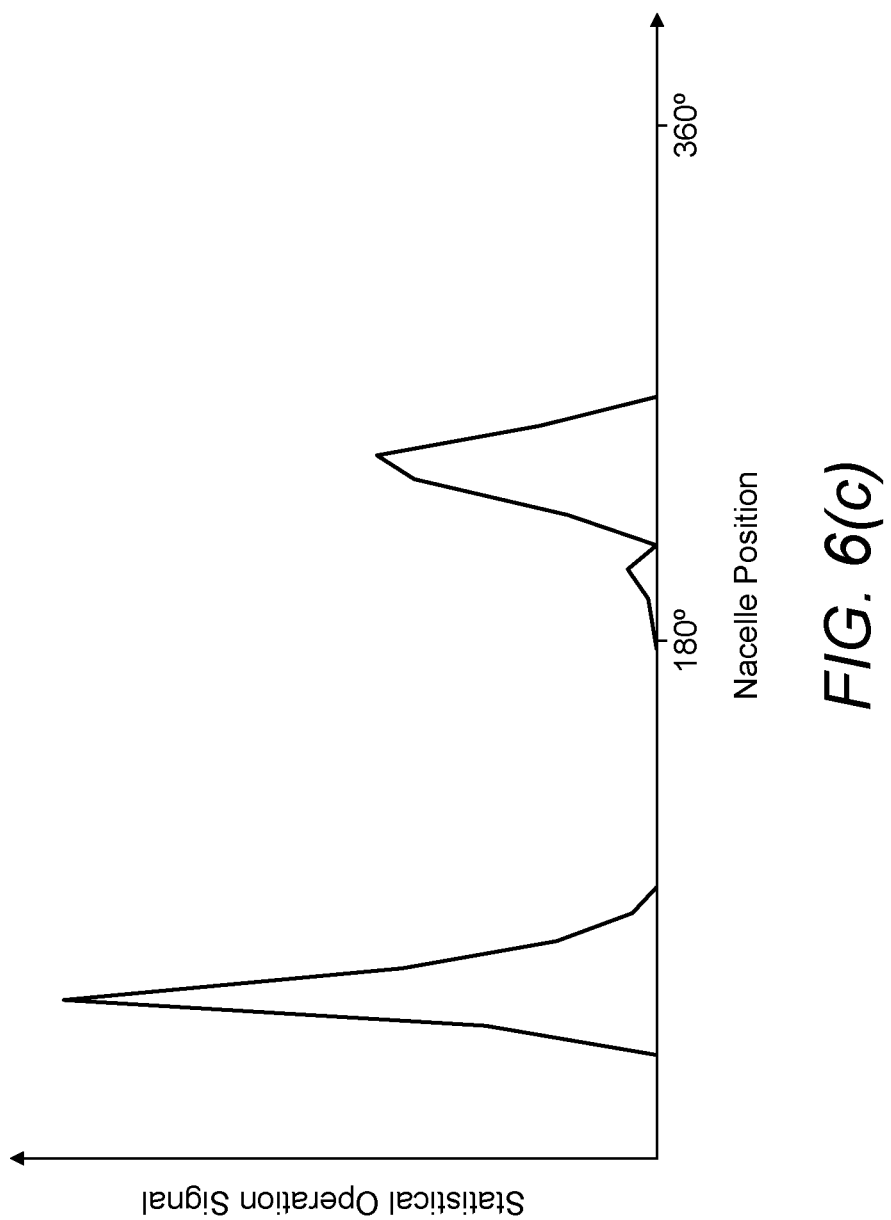

FIGS. 6(a), 6(b) and 6(c) illustrate an example where the monitored parameter is side-to-side acceleration of the top of the wind turbine tower 12 (e.g. obtained from accelerometer measurements) in the case in which recurrent wake flow exists at the same yaw positions as FIG. 5, i.e. at approximately 80 and 230 degrees. In particular, FIG. 6(a) illustrates a moving variance of the tower top acceleration (i.e. the statistical operation signal in this example) for each yaw position of the nacelle 14. It may be seen that the variance fluctuates to a greater degree for this parameter compared to for blade pitch (as illustrated in FIG. 5(a)). In a corresponding manner to FIG. 4, FIG. 6(b) then illustrates how the expected signal for the tower top acceleration parameter may vary for different values of a particular wind turbine signal which, in this example, is different wind speeds. Again in a corresponding manner to as described above, the monitored signal is normalised based on the monitored wind speed and the expected signal is removed from the monitored signal to obtain the moving variance signal illustrated in FIG. 6(c) for different yaw position. It may be seen that the variance spikes at those yaw positions corresponding to the static wakes at approximately 80 and 230 degrees. That is, yaw positions associated with unexpected signals (i.e. large variances relative to an expected signal) therefore indicate the presence of wind field disturbances, in this case recurrent wakes. In this case, this is because the presence of wake flow causes the tower 12 to shake.

Figure 7B:
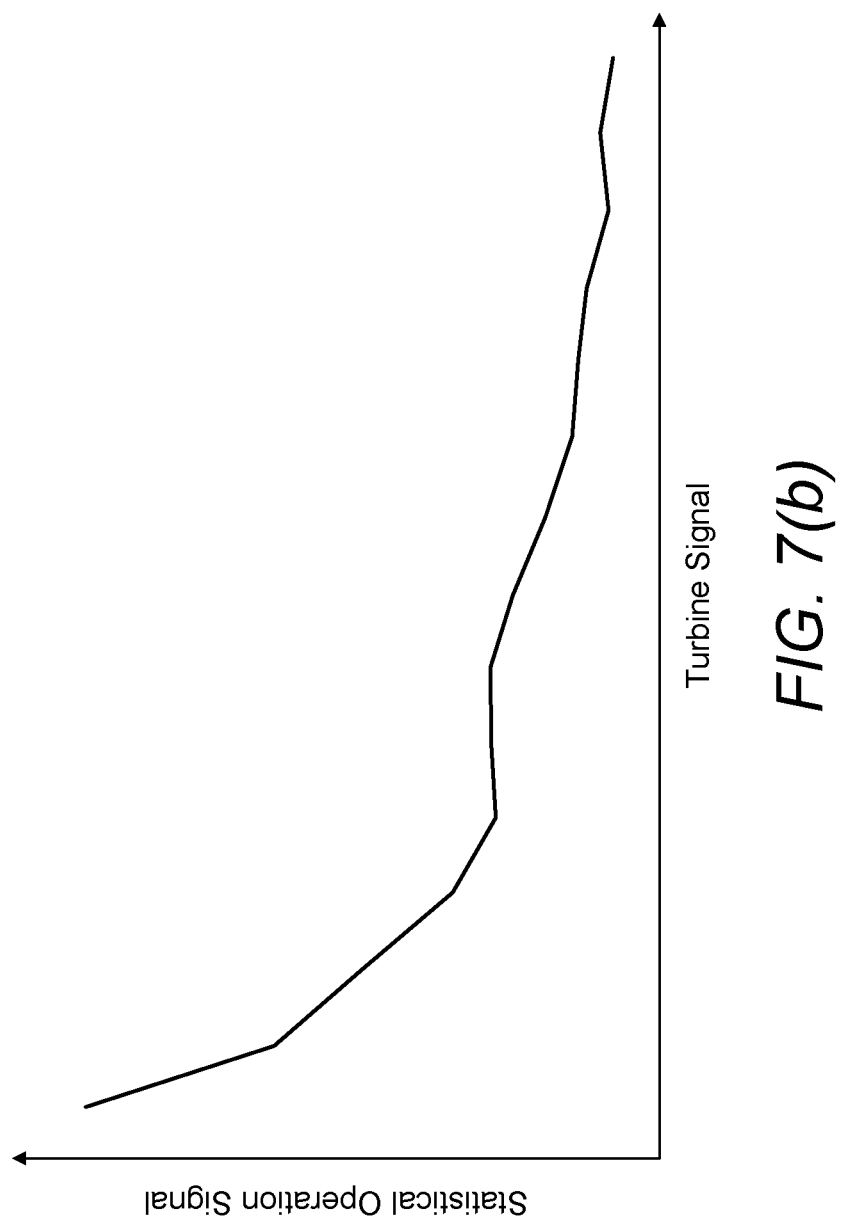
FIG. 7(*a*) illustrates a moving variance of turbulence intensity for different yaw positions of the nacelle of the wind turbine of FIG. 1, FIG. 7(*b*) illustrates how expected values for a turbulence intensity parameter monitored by the controller of FIG. 2 varies for different wind speeds, and FIG. 7(*c*) illustrates the moving variance for different wind speeds after one or more processing steps of the method of FIG. 3 have been applied.
Figure 7C:
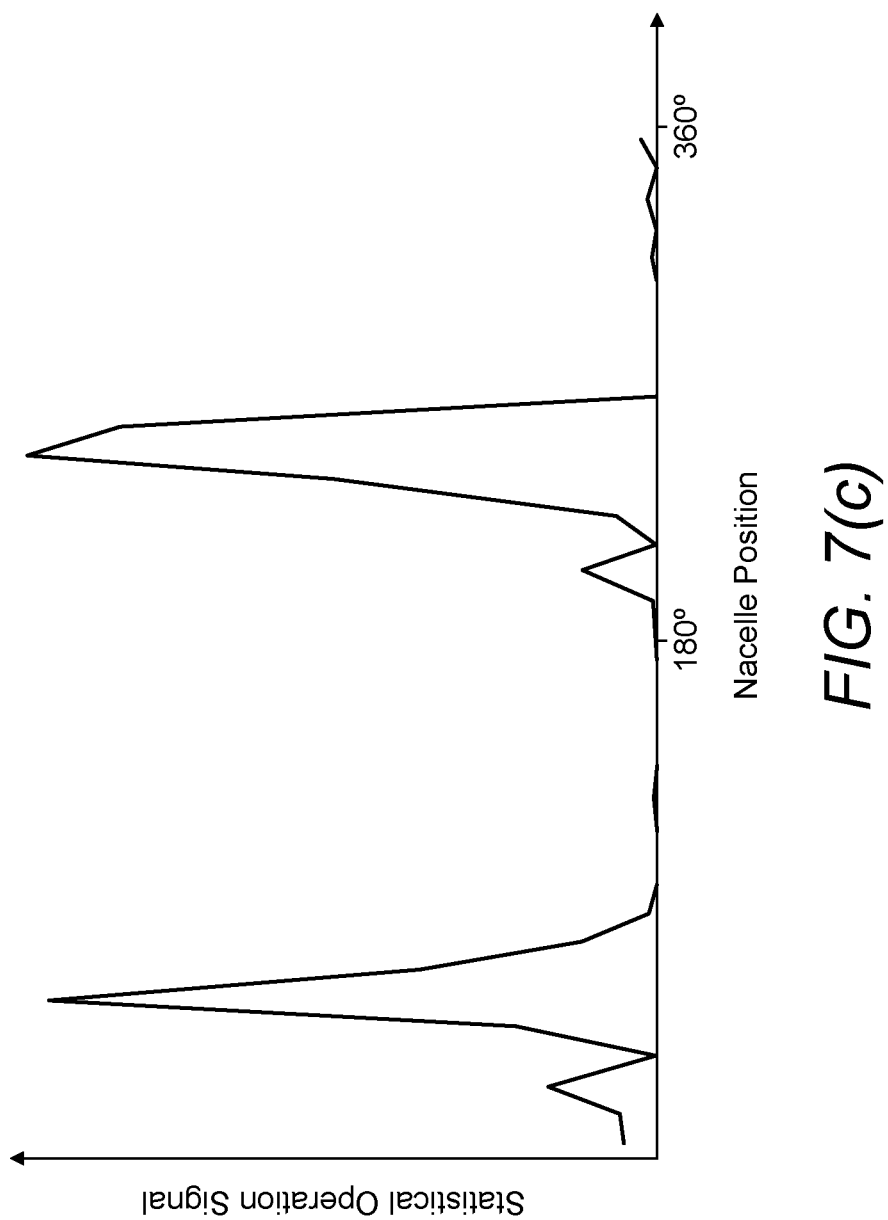

FIGS. 7(a), 7(b) and 7(c) illustrate an example where the monitored parameter is turbulence intensity in the case in which recurrent wake flow exists at approximately 80 and 230 degrees. As a wake will generate turbulence, then this parameter can also be useful for wake identification using the described method. In a corresponding manner to the above examples, FIG. 7(a) illustrates a statistical operation signal in the form of a moving variance of the turbulence intensity for each yaw position of the nacelle 14, FIG. 7(b)

illustrates how the expected signal for the turbulence intensity parameter varies for different wind speeds (i.e. the particular wind turbine signal in this example), and FIG. 7(c) illustrates the moving variance for different wind speeds after the monitored signal has been normalised by wind speed and the expected signal has been removed.

FIGS. 8 and 9 illustrate further different parameters that may be monitored to identify recurrent wind field disturbances, specifically in the case in which recurrent wake flow exists at approximately 80 and 230 degrees. In particular, FIGS. 8 and 9 illustrate examples in which the monitored parameter is loading on the wind turbine rotor blades 10. A wake will generate differences between forces applied to the rotor blades 18 in dependence on where a blade is positioned around its rotational path. FIG. 10 schematically illustrates how the blade rotor plane may be split into quadrants, namely, left, right, upper and lower quadrants.

Figure 8A:
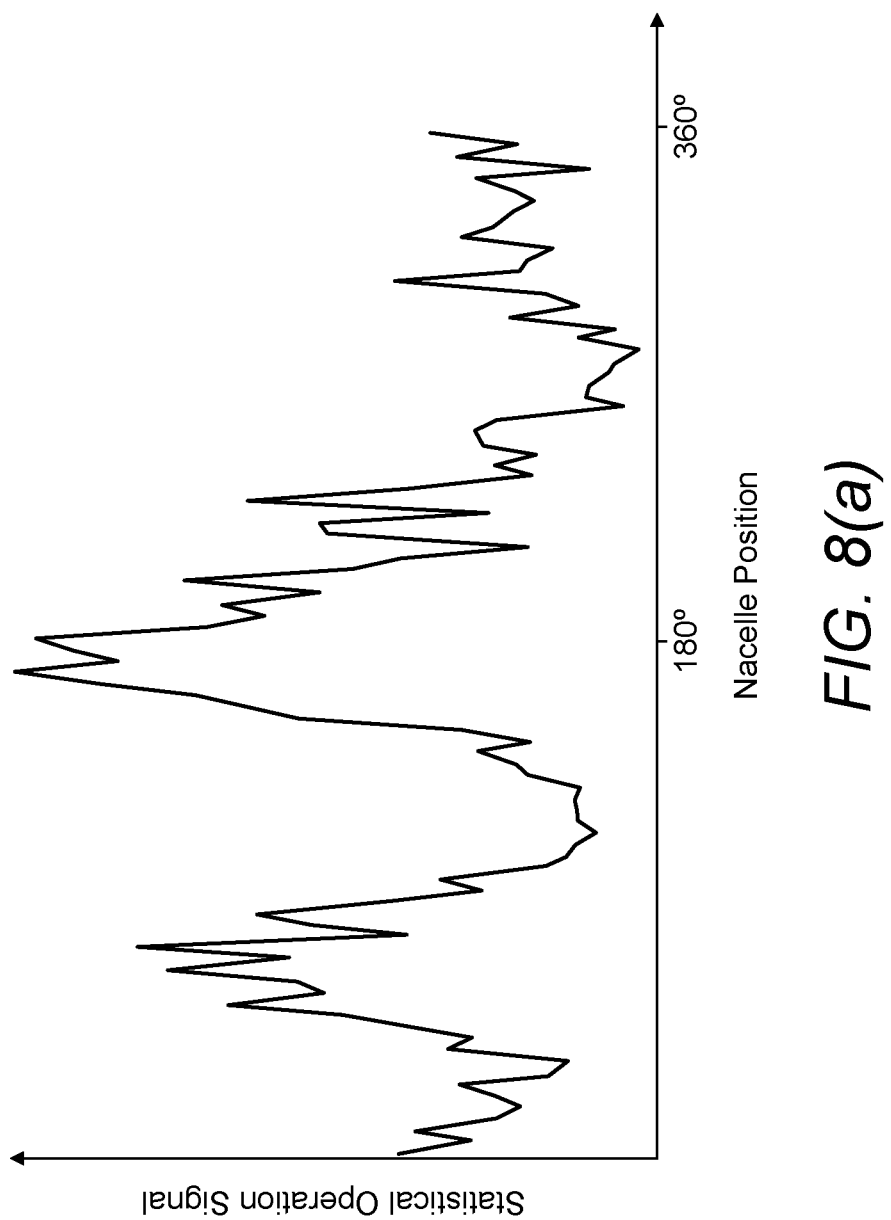
FIG. 8(*a*) illustrates a moving variance of a difference in blade loading between left and right quadrants of a rotor plane for different yaw positions of the nacelle of the wind turbine of FIG. 1, FIG. 8(*b*) illustrates how expected values for a difference in blade loading between left and right quadrants parameter monitored by the controller of FIG. 2 varies for different wind speeds, and FIG. 8(*c*) illustrates the moving variance for different wind speeds after one or more processing steps of the method of FIG. 3 have been applied.
Figure 8B:
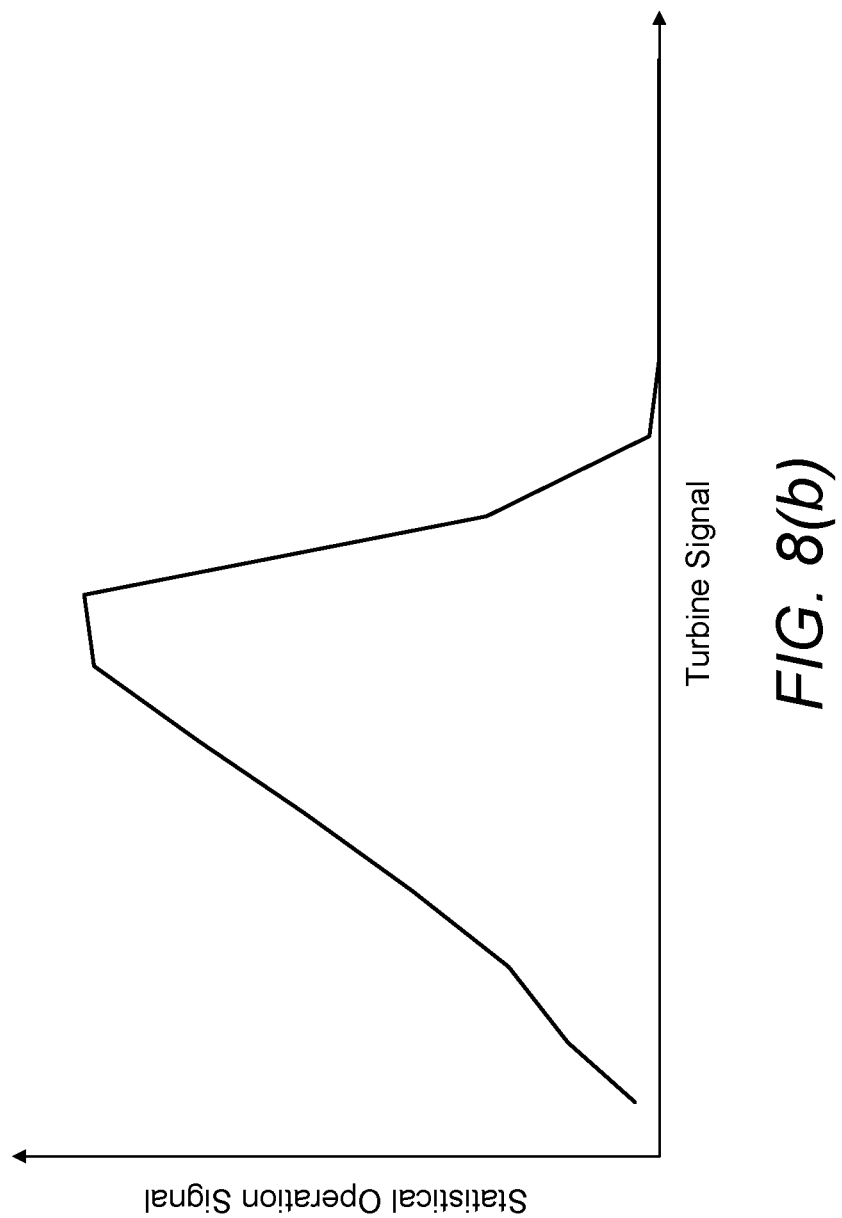
Figure 8C:
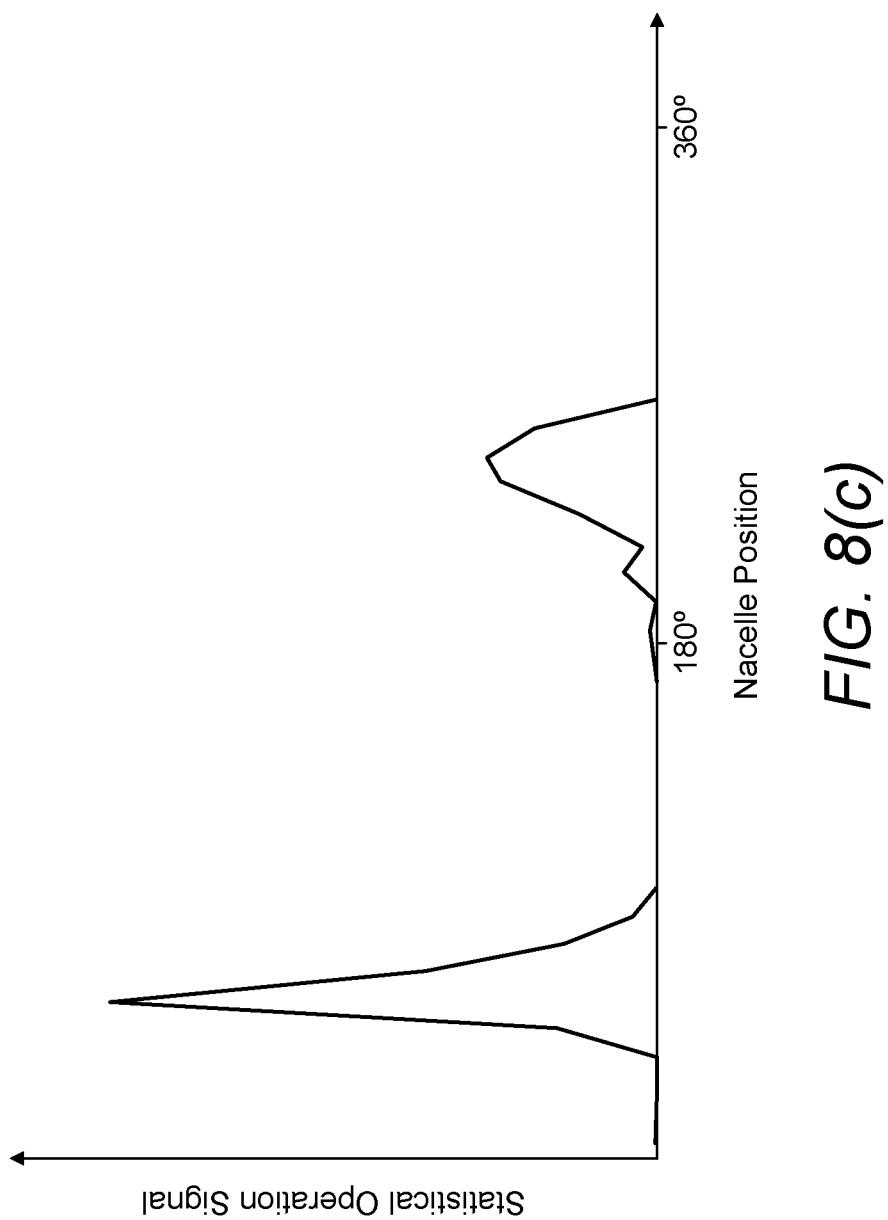

In FIG. 8, the monitored parameter is a difference in blade loading between the left and right quadrants. Specifically, FIG. 8(a) illustrates a statistical operation signal in the form of a moving variance of the difference in blade loading between the left and right quadrants for each yaw position of the nacelle 14, FIG. 8(b) illustrates how the expected signal for the left-right loading difference parameter varies for different wind speeds (i.e. the particular wind turbine signal in this example), and FIG. 8(c) illustrates the moving variance for different wind speeds after the monitored signal has been normalised by wind speed and the expected signal has been removed.

Figure 9B:
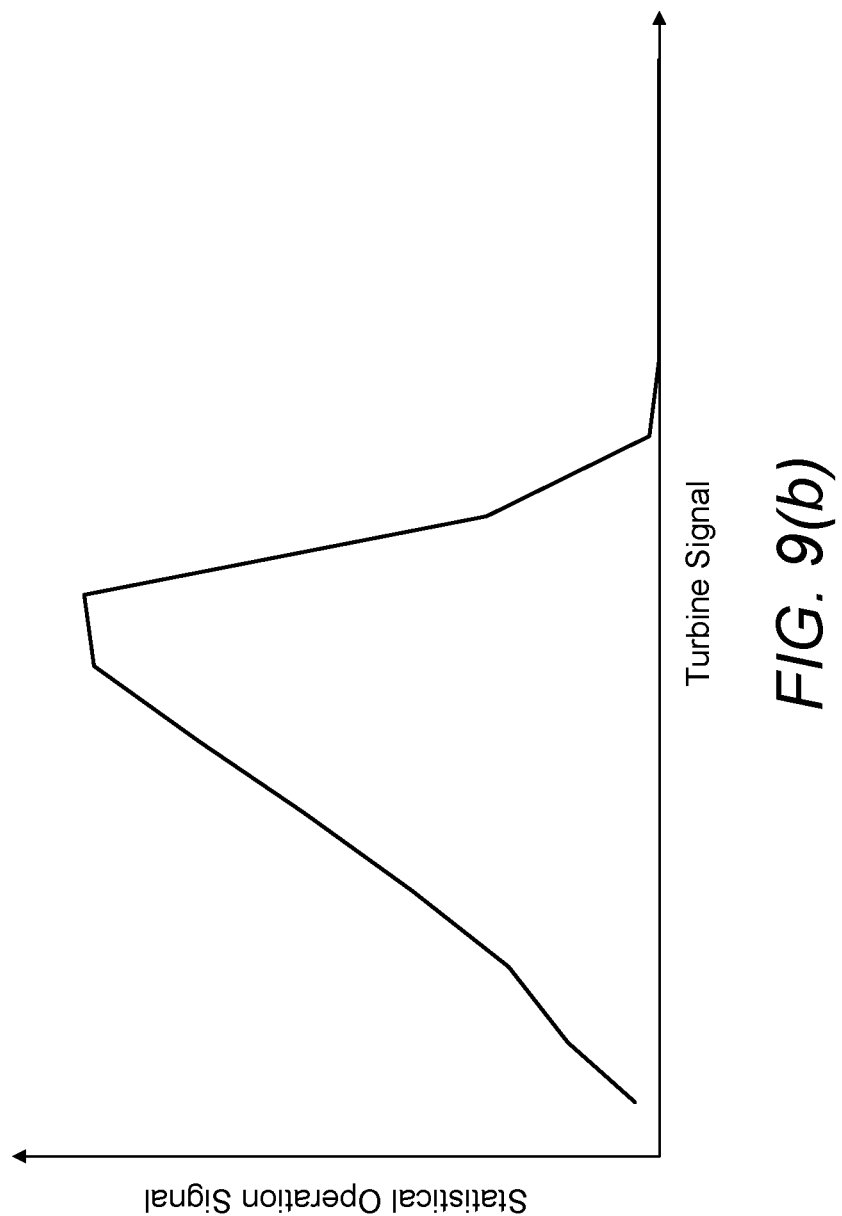
FIG. 9(*a*) illustrates a moving variance of a difference in blade loading between upper and lower quadrants of the rotor plane for different yaw positions of the nacelle of the wind turbine of FIG. 1, FIG. 9(*b*) illustrates how expected values for a difference in blade loading between upper and lower quadrants parameter monitored by the controller of FIG. 2 varies for different wind speeds, and FIG. 9(*c*) illustrates the moving variance for different wind speeds after one or more processing steps of the method of FIG. 3 have been applied.
Figure 9C:
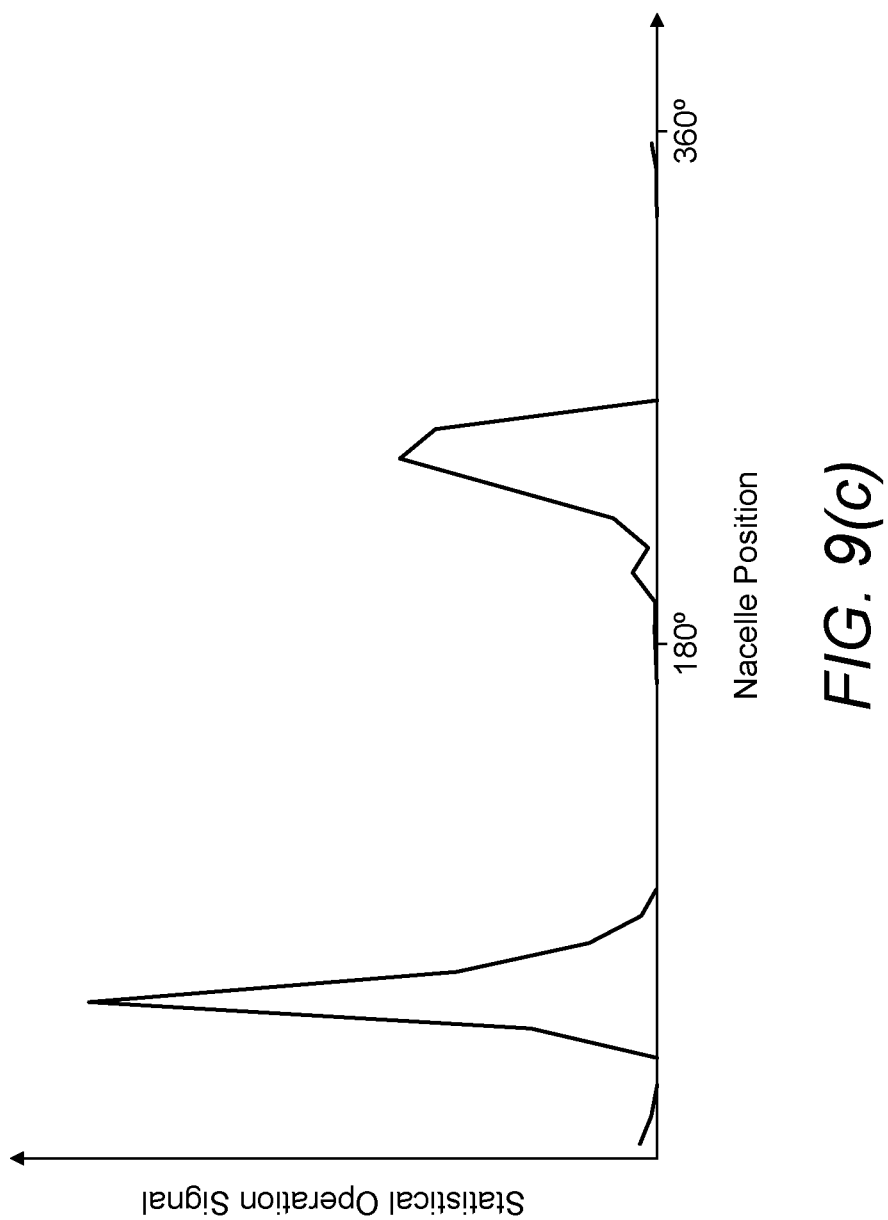
Figure 10:
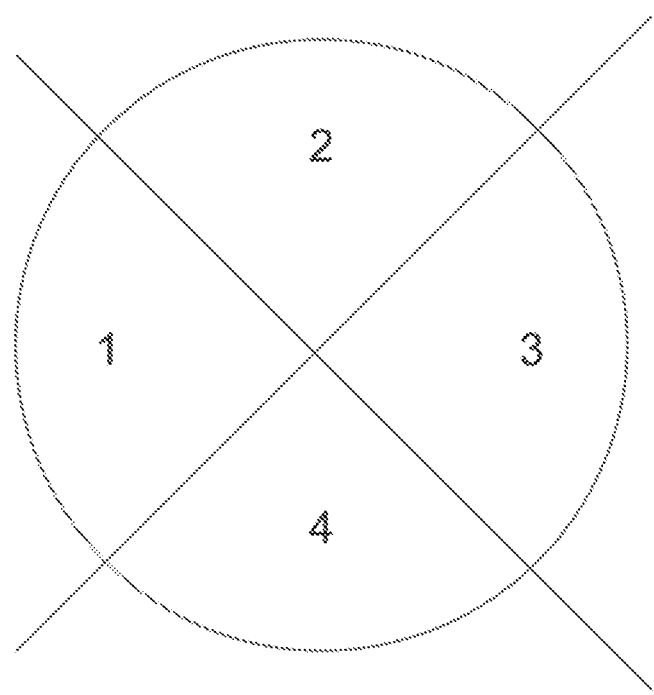
FIG. 10 schematically illustrates how a blade rotor plane of the wind turbine of FIG. 1 is split into quadrants; and, FIG. 11 illustrates plots of an example in which wake identification results obtained based on the different monitored parameters are combined, where each wake identification result is determined in accordance with the method of FIG. 3.

In a corresponding manner, in FIG. 9 the monitored parameter is a difference in blade loading between the upper and lower quadrants. FIG. 9(a) illustrates a statistical operation signal in the form of a moving variance of the difference in blade loading between the upper and lower quadrants for each yaw position of the nacelle 14, FIG. 9(b) illustrates an example of how the expected signal for the upper-lower loading difference parameter varies for different wind speeds (i.e. the particular wind turbine signal in this example), and FIG. 9(c) illustrates the moving variance for different wind speeds after the monitored signal has been normalised by wind speed and the expected signal has been removed.

Figure 11:
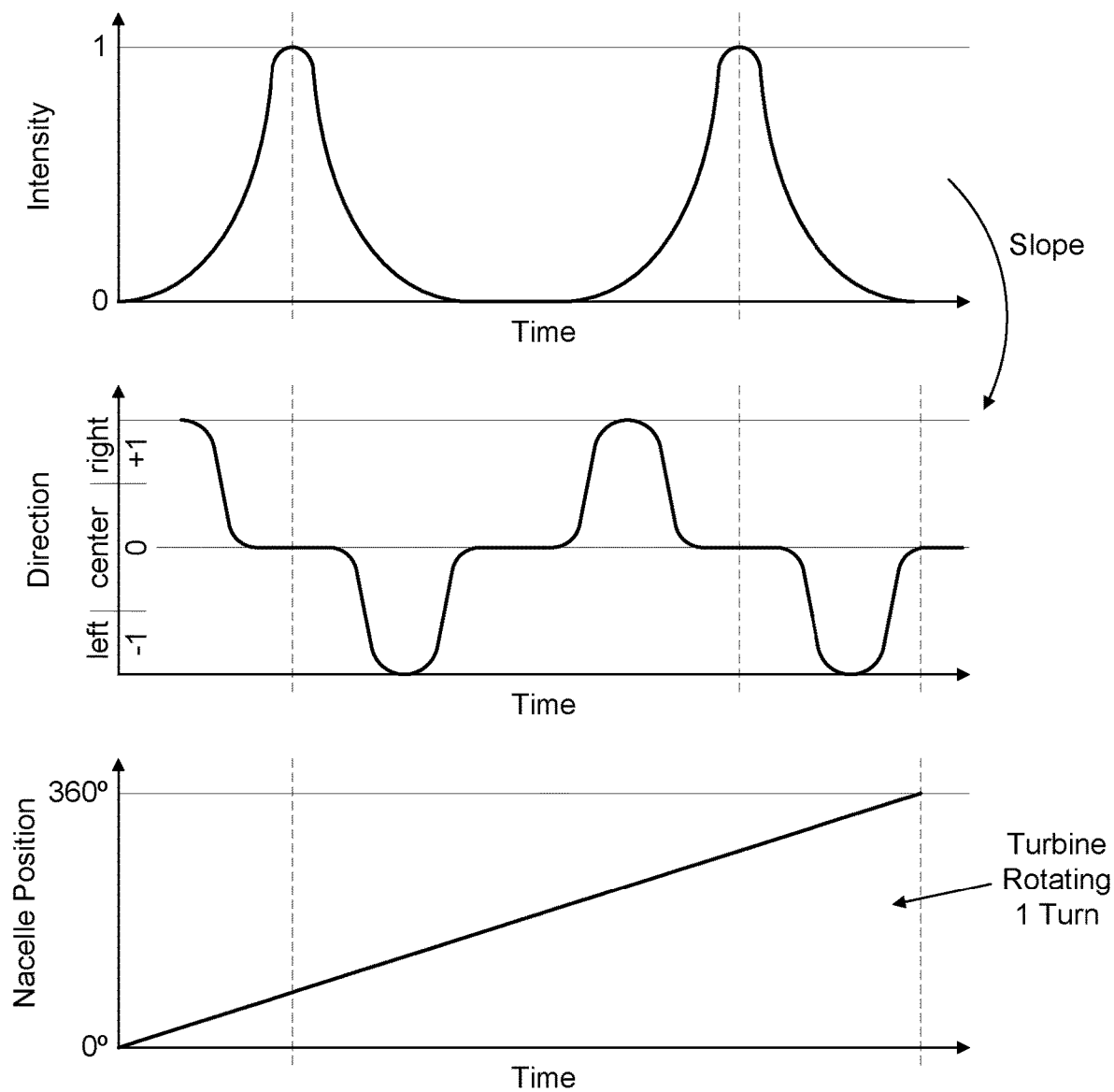

As is apparent from the figures illustrating the above-outlined different methods, disturbances in the monitored signals may be identifiable to varying degrees for different monitored parameters. It may be that although there is general agreement between some of the different methods at certain points in time, there are differences between the results of different methods at other times. One option for improving the accuracy of identifications made according to the described method may be to combine or fuse together the results for different monitored parameters to make an overall identification of recurrent free-flow wind disturbances (as well as details such as their intensity, direction, etc.). FIG. 11 illustrates plots of an example in which the identification results obtained based on different monitored parameters are combined, where FIG. 11 in particular shows plots of wake intensity, direction and yaw position over time of an overall determination based on the individual results. The slope of the intensity in the first plot provides the direction of the disturbance in the second plot, where a value of −1 in the second plot indicates that the disturbance is to the left of the turbine 10 and a value of +1 indicates that the disturbance is to the right of the turbine 10. In this case, individual methods are combined, and in particular the results are combined using a simple weighted average. The weights associated with certain monitored parameter results may greater than for others if certain parameters tend to provide more accurate results than others.

The method may further include determining a confidence level associated with the identified recurrent free-flow wind disturbance. This confidence level can indicate a level of certainty the method has in the accuracy of an identified disturbance, and its particular characteristics (intensity, etc.). In a case in which the results of a plurality of different methods (for different monitored parameters) are combined, the confidence level may be determined based on a level of agreement between the different methods. A greater level of agreement in the results of different methods may correspond to a greater confidence level being associated with the results. The confidence level may alternatively or additionally be determined based on an amount of signal data on which the identification analysis is based. For instance, if a recurrent wind field disturbance has been identified in association with a particular yaw position of the nacelle 14, but the nacelle 14 has had limited operation at said yaw position, then the identification may have been made on the basis of limited data. As such, an identification made on this basis may have a lower confidence level associated therewith than one made on the basis of a larger monitored data set.

One reason that identification of recurrent free-flow wind disturbances may be desirable is because they can negatively impact the capability of a wind turbine to operate efficiently, for instance to maximise power production for the grid or minimise loading on the wind turbine components. Upon identification of such a disturbance by the above-described methods, one option may be to compare a measured wind turbine performance (e.g. power production to the grid, component loading, etc.) in the presence of the identified recurrent free-flow wind disturbance relative to an expected wind turbine performance in such operating conditions. If the identified disturbance does not in fact appear to significantly influence wind turbine performance then the identified disturbance may be discarded, or may not be considered in ongoing or future control of the wind turbine. On the other hand, if a difference between the measured and expected wind turbine performance exceeds a prescribed performance threshold, then the identified disturbance may be retained and taken into consideration for determining control steps performed by the turbine.

As mentioned above, operation of the wind turbine 10 may be controlled based on the identified recurrent free-flow wind disturbance. This may include controlling yaw position of the nacelle 14, controlling pitch angle of one or more of the wind turbine rotor blades 18, and/or controlling a speed of a generator of the wind turbine 10, for instance. The identified recurrent free-flow wind disturbance may also be used when designing a layout of a wind farm, for instance to position turbines relative to each other to reduce the impact of wakes generated by one turbine on other, adjacent turbines, so as to optimise operating efficiency of the wind farm, thereby maximising the economic returns of a wind farm.

Many modifications may be made to the described examples without departing from the scope of the appended claims.

Although the above examples are described with reference to identifying disturbances in the form of wakes, it will be appreciated that the present invention can be used to identify different types of recurrent free-flow wind disturbances or wind field effects associated with, or experienced by, a wind turbine. For instance, in a particular location, turbulence, flow separation, wave patterns, etc. may be prevalent in the vicinity of particular wind turbines, and may be caused by different environmental factors at or near to the location. For instance, these can include structures, such as buildings, in the vicinity of the wind turbine or wind farm, features of the terrain in the vicinity of, or surrounding, a wind turbine or wind farm can cause wind field disturbances, and/or weather phenomena at the location of a wind turbine or wind farm. In general, therefore, the invention can be applied to identify different types of recurrent free-flow wind disturbances that impact on wind turbine states.

In the above examples, a wake (or other wind field effect) is identified as being associated with a particular yaw position of the wind turbine nacelle. However, it will be appreciated that in different examples of the invention, wind field effects may be identified in association with different variables associated with the wind turbine. For instance, wind field effects could be identified in association with an absolute wind direction in the vicinity of the wind turbine. The variable considered in this regard may be an independent variable, i.e. one for which a degree of control is possible, such that the effects of an identified wind field effect may be mitigated. It will also be appreciated that wind field effects in association with a plurality of different variables may also be considered.

The invention claimed is:

1. A method of identifying recurrent free-flow wind disturbances associated with a wind turbine, the method comprising:
   monitoring a signal indicative of a parameter associated with operation of the wind turbine;
   determining an expected signal of the parameter based on the monitored signal;
   determining a difference between values of the monitored signal and the determined expected signal, and correlating the determined differences with yaw position of a nacelle of the wind turbine;
   determining, based on the correlated differences, unexpected values of the parameter for different yaw positions; and,
   identifying, based on a frequency of occurrence of the determined unexpected values, a recurrent free-flow wind disturbance associated with a yaw position of the nacelle.

2. The method according to claim 1, the method further comprising determining a normalised expected signal by normalising the expected signal based on a further signal indicative of a further parameter associated with operation of the wind turbine, wherein determining the differences comprises comparing values of the monitored signal, normalised based on the further signal, and the determined normalised expected signal.

3. The method according to claim 1, wherein determining the expected signal comprises determining one or more statistical properties of the monitored signal.

4. The method according to claim 3, wherein the statistical properties include one or more of a statistical mean, a standard deviation, and a variance.

5. The method according to claim 1, wherein the expected signal is updated over time as the monitored signal is acquired.

6. The method according to claim 5, wherein the expected signal is determined based on the monitored signal acquired in a prescribed time interval relative to, and prior to, a current time step.

7. The method according to claim 1, wherein determining unexpected values of the parameter comprises determining, based on the correlated differences, a range of differences associated with normal operation of the wind turbine, and identifying correlated differences outside of the determined range to correspond to unexpected values of the parameter.

8. The method according to claim 1, the method further comprising determining an intensity of the identified recurrent free-flow wind disturbance, the intensity being based on a magnitude of the differences between the unexpected values and the expected signal.

9. The method according to claim 1, the method further comprising determining a direction of the identified recurrent free-flow wind disturbance relative to the wind turbine, the direction being determined as a derivative of the differences between the unexpected values and the expected signal with respect to a current yaw position of the nacelle.

10. The method according to claim 1, the method further comprising comparing measured wind turbine performance in the presence of the identified recurrent free-flow wind disturbance relative to an expected wind turbine performance, and retaining the identified recurrent free-flow wind disturbance if a difference between the measured and expected wind turbine performance exceeds a prescribed performance threshold.

11. The method according to claim 10, wherein wind turbine performance is power generated by the wind turbine or loading on one or more components of the wind turbine.

12. The method according to claim 1, wherein the parameter is one of:
   a pitch angle of one or more rotor blades of the wind turbine;
   one or more loads on the rotor blades;
   an acceleration of the top of a tower of the wind turbine;
   a wind speed in the vicinity of the wind turbine;
   a wind direction in the vicinity of the wind turbine;
   a turbulence intensity in the vicinity of the wind turbine; and,
   a grid power.

13. The method according to claim 1, the method further comprising performing the monitoring, determining the expected signal, determining the difference, correlating, determining unexpected values of the parameter for different yaw positions; and, identifying for a plurality of different parameters, and combining the identified recurrent free-flow wind disturbances for each of the different parameters to obtain an overall identification of one or more recurrent free-flow wind disturbances.

14. The method according to claim 13, the method further comprising determining a confidence level associated with the identified recurrent free-flow wind disturbance, the confidence level being determined based on at least one of:
   when a level of agreement between an output for the plurality of different parameters; or
   an amount of signal data on which the identification is based.

15. The method according to claim 1, wherein the recurrent free-flow wind disturbance is wake flow in the vicinity of the wind turbine.

16. The method according to claim 1, the method further comprising controlling operation of the wind turbine based on the identified recurrent free-flow wind disturbance.

17. The method according to claim 16, wherein controlling operation of the wind turbine comprises at least one of: controlling yaw position of the nacelle, controlling pitch angle of one or more wind turbine rotor blades, or controlling a speed of a generator of the wind turbine.

18. A controller for identifying recurrent free-flow wind disturbances associated with a wind turbine, the controller being configured to:

monitor a signal indicative of a parameter associated with operation of the wind turbine;

determine an expected signal of the parameter based on the monitored signal;

determine a difference between values of the monitored signal and the determined expected signal, and correlate the determined differences with yaw position of a nacelle of the wind turbine;

determine, based on the correlated differences, unexpected values of the parameter for different yaw positions; and, identify, based on a frequency of occurrence of the determined unexpected values, a recurrent free-flow wind disturbance associated with a yaw position of the nacelle.

19. A wind turbine, comprising:

a tower;

a nacelle disposed on the tower;

a generator housed in the nacelle;

a rotor extending from the generator and having a plurality of blades disposed on a distal end thereof; and a controller configured to perform an operation identifying recurrent free-flow wind disturbances associated with the wind turbine, the operation comprising:

monitoring a signal indicative of a parameter associated with operation of the wind turbine;

determining an expected signal of the parameter based on the monitored signal;

determining a difference between values of the monitored signal and the determined expected signal, and correlating the determined differences with yaw position of the nacelle;

determining, based on the correlated differences, unexpected values of the parameter for different yaw positions; and identifying, based on a frequency of occurrence of the determined unexpected values, a recurrent free-flow wind disturbance associated with a yaw position of the nacelle.

20. A wind turbine according to claim 19, the operation further comprising determining a normalised expected signal by normalising the expected signal based on a further signal indicative of a further parameter associated with operation of the wind turbine, wherein determining the differences comprises comparing values of the monitored signal, normalised based on the further signal, and the determined normalised expected signal.

* * * * *